(12) United States Patent
Park

(10) Patent No.: US 10,632,810 B2
(45) Date of Patent: Apr. 28, 2020

(54) SUSPENSION SYSTEM FOR VEHICLE

(71) Applicant: HYUNDAI MOBIS CO., LTD., Seoul (KR)

(72) Inventor: Kyung Ryul Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/161,727

(22) Filed: Oct. 16, 2018

(65) Prior Publication Data

US 2019/0111752 A1 Apr. 18, 2019

(30) Foreign Application Priority Data

Oct. 16, 2017 (KR) .................. 10-2017-0133891

(51) Int. Cl.
*B60G 13/14* (2006.01)
*B60K 25/10* (2006.01)
*F03G 7/08* (2006.01)

(52) U.S. Cl.
CPC .............. *B60G 13/14* (2013.01); *B60K 25/10* (2013.01); *F03G 7/08* (2013.01); *B60G 2202/22* (2013.01); *B60G 2204/129* (2013.01); *B60G 2204/4191* (2013.01); *B60G 2300/60* (2013.01); *B60K 2025/103* (2013.01)

(58) Field of Classification Search
CPC .... B60G 13/14; B60G 2300/60; B60K 25/10; F03G 7/08
See application file for complete search history.

(56) References Cited

U.S. PATENT DOCUMENTS

| 7,938,217 | B2* | 5/2011 | Stansbury, III | ........... | F03G 7/08 |
| | | | | | 180/165 |
| 8,840,118 | B1* | 9/2014 | Giovanardi | ......... | F15B 13/0444 |
| | | | | | 280/5.5 |
| 9,030,033 | B2* | 5/2015 | Yoo | .......................... | B60G 7/02 |
| | | | | | 180/165 |
| 9,270,131 | B2* | 2/2016 | Stansbury, III | ........ | B60K 25/10 |
| 9,270,153 | B2* | 2/2016 | Yoo | ............................ | F03G 7/08 |
| 2009/0229902 | A1* | 9/2009 | Stansbury, III | ........ | B60K 25/10 |
| | | | | | 180/165 |
| 2010/0281858 | A1* | 11/2010 | Stansbury, III | ........ | B60K 25/10 |
| | | | | | 60/327 |
| 2012/0313575 | A1* | 12/2012 | Stansbury, III | ........ | B60K 25/10 |
| | | | | | 320/107 |

(Continued)

FOREIGN PATENT DOCUMENTS

KR 10-0971152 B1 7/2010

*Primary Examiner* — Bryan A Evans
(74) *Attorney, Agent, or Firm* — Knobbe Martens Olson & Bear LLP

(57) ABSTRACT

A suspension system may include a lower arm configured to perform a vibrating movement by vibration of the vehicle, a reducer connected to the lower arm so that the vibrating movement of the lower arm is transmitted thereto, and a motor unit connected to the reducer, and configured to receive power from the reducer. The reducer may include an input shaft unit rotatably mounted to the housing and connected to the lower arm to be rotated by vibration of the lower arm, a gear unit configured to receive a rotating force from the input shaft unit, an output shaft unit configured to receive power from the gear unit, and a clutch unit selectively connecting the gear unit with the output shaft unit.

6 Claims, 6 Drawing Sheets

(56) References Cited

U.S. PATENT DOCUMENTS

| | | | | |
|---|---|---|---|---|
| 2014/0182955 A1* | 7/2014 | Yoo | ............... | B60G 7/006 |
| | | | | 180/65.31 |
| 2014/0183873 A1* | 7/2014 | Yoo | ............... | H02K 7/1853 |
| | | | | 290/1 C |
| 2014/0353060 A1* | 12/2014 | Stansbury, III | ........ | B60K 25/10 |
| | | | | 180/165 |

* cited by examiner

SUSPENSION SYSTEM FOR VEHICLE

CROSS-REFERENCES TO RELATED APPLICATIONS

The present application claims priority to Korean application number 10-2017-0133891, filed on Oct. 16, 2017, which is incorporated by reference in its entirety.

BACKGROUND OF THE INVENTION

The present invention relates to a suspension system for a vehicle, and more particularly, to a suspension system for a vehicle, which recovers a vertical movement produced when the vehicle is running, thus generating power.

In general, a suspension system includes a spring, a damper (or shock absorber), a stabilizer bar and others, and improves the ride comfort and stability of a vehicle by adjusting a spring constant, a damping force and a vehicle height.

The damper is provided with a piston assembly that defines a circulation passage to attenuate shock and vibration while circulating oil filled in the damper up and down. Thus, if a bump, a rebound or a cornering force is applied to a wheel as the vehicle is turned or driven, the shock absorber vibrates up and down via a knuckle part, thus absorbing shock caused by the bump and the rebound, and maintaining stability when the vehicle is turned.

In a conventional suspension system, there is disclosed technology for generating power using a damper that absorbs a vertical movement produced when the vehicle is running and stabilizes the posture of a vehicle body. The suspension system configured as such generates energy by converting a rectilinear movement into a rotary movement using a rack, a pinion and a bevel gear, or generates energy by converting a rectilinear movement into a rotary movement using a ball screw.

A conventional generator of a suspension system having a motor and a ball screw or a rack and a pinion is operated by directly connecting the motor with a power transmission device. The direct connection leads to a reduction in durability when a strong reaction force or shock is generated between the motor and the power transmission device. Therefore, there is a need to improve the related art.

The related art of the present invention is disclosed in Korean Patent No. 10-0971152 registered on Jul. 13, 2010 and entitled "Generator using suspension system of vehicle".

SUMMARY OF THE INVENTION

Embodiments of the present invention are directed to a suspension system for a vehicle, which recovers a vertical movement produced when the vehicle is running, thus generating power.

In one embodiment, a suspension system for a vehicle may include: a lower arm configured to perform a vibrating movement by vibration of the vehicle; a reducer connected to the lower arm so that the vibrating movement of the lower arm is transmitted thereto; and a motor unit connected to the reducer and configured to receive power from the reducer, wherein the reducer may include a housing; an input shaft unit rotatably mounted to the housing and connected to the lower arm to be rotated by vibration of the lower arm; a gear unit configured to receive a rotating force from the input shaft unit; an output shaft unit configured to receive power from the gear unit; and a clutch unit configured to selectively connect the gear unit with the output shaft unit.

The gear unit may include a first sun gear mounted to the housing to rotatably support the input shaft unit; a first planetary gear rotatably mounted to a first side of a connection shaft connected to the input shaft unit, and configured to rotate in the same direction as a rotating direction of the input shaft unit; a second planetary gear rotatably mounted to a second side of the connection shaft, and configured to rotate in the same direction as a rotating direction of the first planetary gear; a ring gear engaging at an inner surface thereof with the second planetary gear, and configured to rotate in the same direction as a rotating direction of the second planetary gear; and a second sun gear engaging at an outer surface thereof with the second planetary gear, and configured to rotate in a direction opposite to the rotating direction of the second planetary gear.

The output shaft unit may include a first output shaft configured to rotate as the second sun gear rotates; and a second output shaft configured to be selectively connected by the clutch unit and rotated when rotation is selectively transmitted from the first output shaft or the ring gear.

The clutch unit may transmit power to cause a rotation in one direction.

The clutch unit may include a first clutch interposed between the first output shaft and the second output shaft and configured to transmit power of the first output shaft rotated in one direction to the second output shaft.

The clutch unit may include a second clutch interposed between the ring gear and the second output shaft and configured to transmit power of the ring gear rotated in one direction to the second output shaft.

The suspension system may further include a belt unit connecting a lower arm shaft of the lower arm with the reducer, and configured to transmit a rotating force from the lower arm shaft to the reducer.

The suspension system for the vehicle in accordance with the present invention recovers a vertical movement, such as vibration, produced when the vehicle is running, thus generating power and thereby recycling energy.

Furthermore, in accordance with the present invention, it is possible to recover a vertical movement, thus recycling energy and simultaneously absorbing the vibration of a vehicle.

Furthermore, in accordance with the present invention, it is possible to transmit power to a motor unit in a predetermined direction regardless of the rotating direction of an input shaft unit.

DESCRIPTION OF SPECIFIC EMBODIMENTS

Hereinafter, an embodiment of a suspension system for a vehicle in accordance with the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
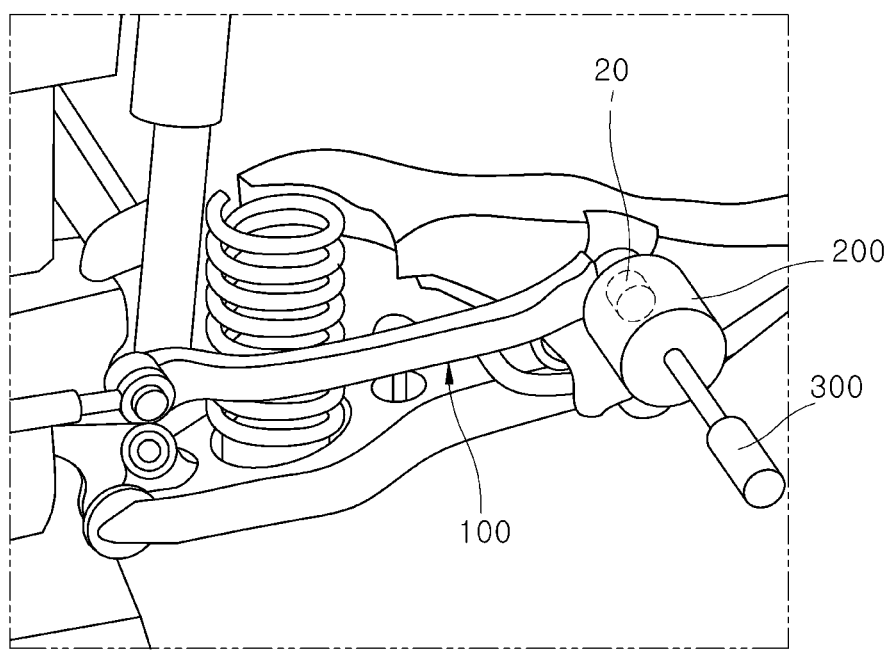
FIG. 1 is a perspective diagram schematically illustrating a suspension system for a vehicle in accordance with an embodiment of the present invention.
Figure 2:
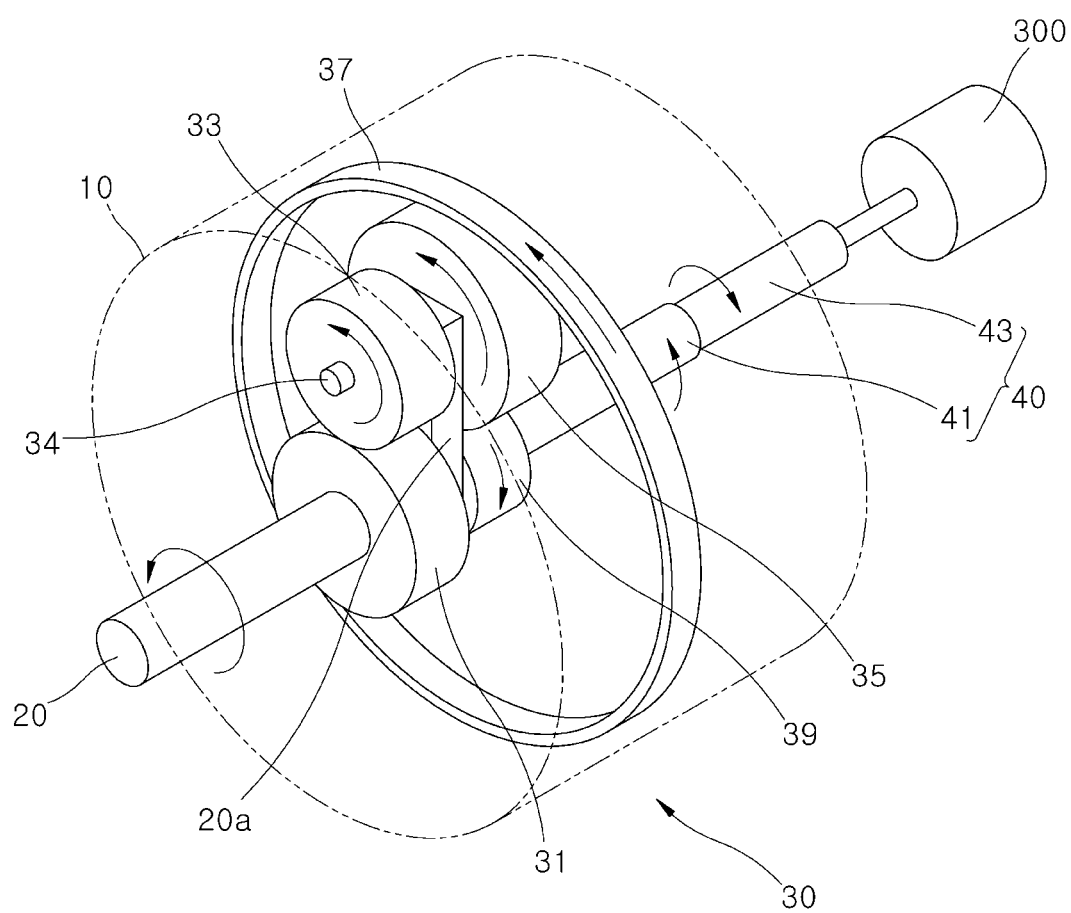
FIG. 2 is a perspective diagram schematically illustrating a reducer in accordance with the embodiment of the present invention.
Figure 3:
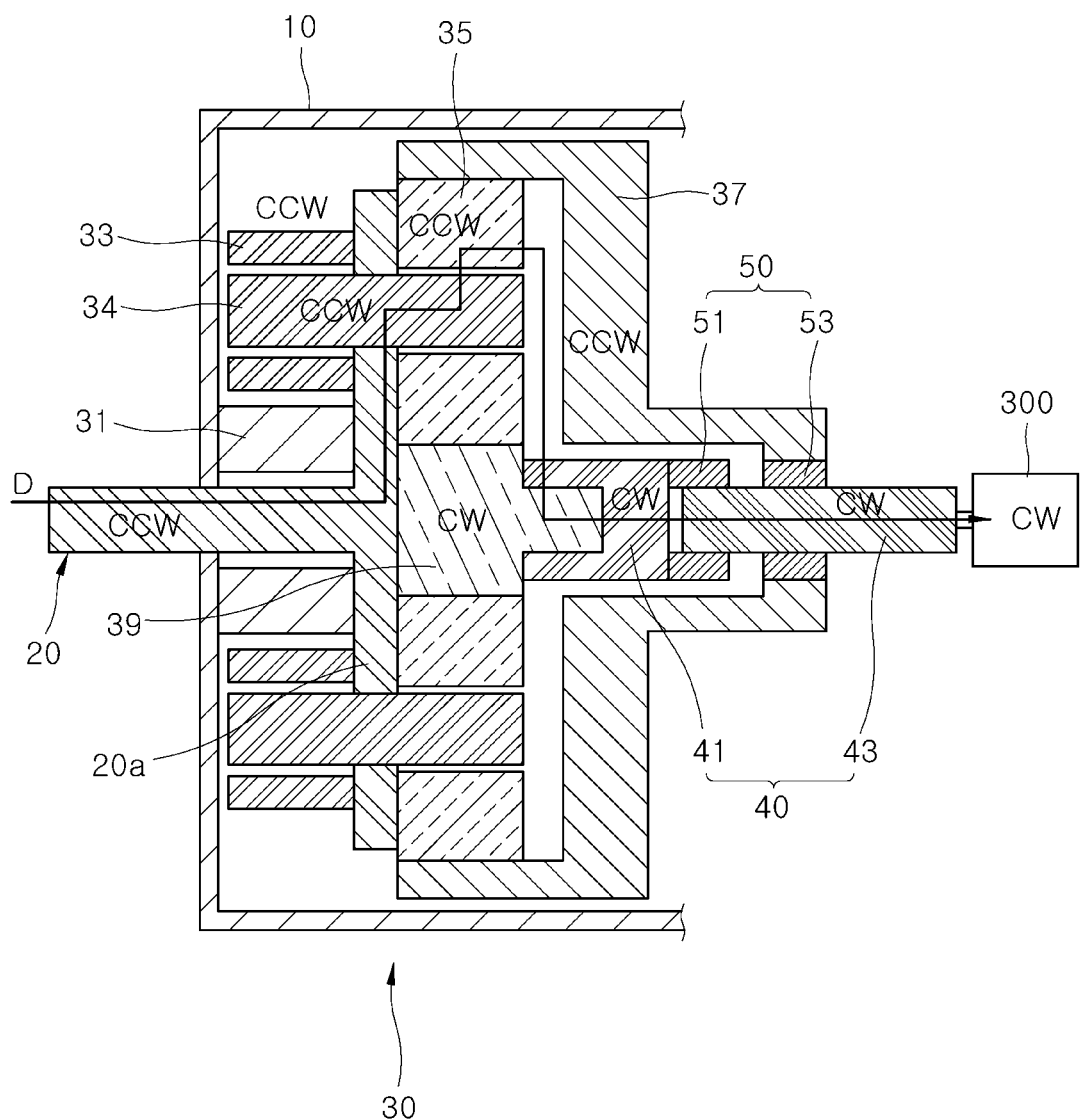
FIG. 3 is a sectional diagram schematically illustrating an operation by an input shaft unit that is rotated in one direction in the reducer in accordance with the embodiment of the present invention.
Figure 4:
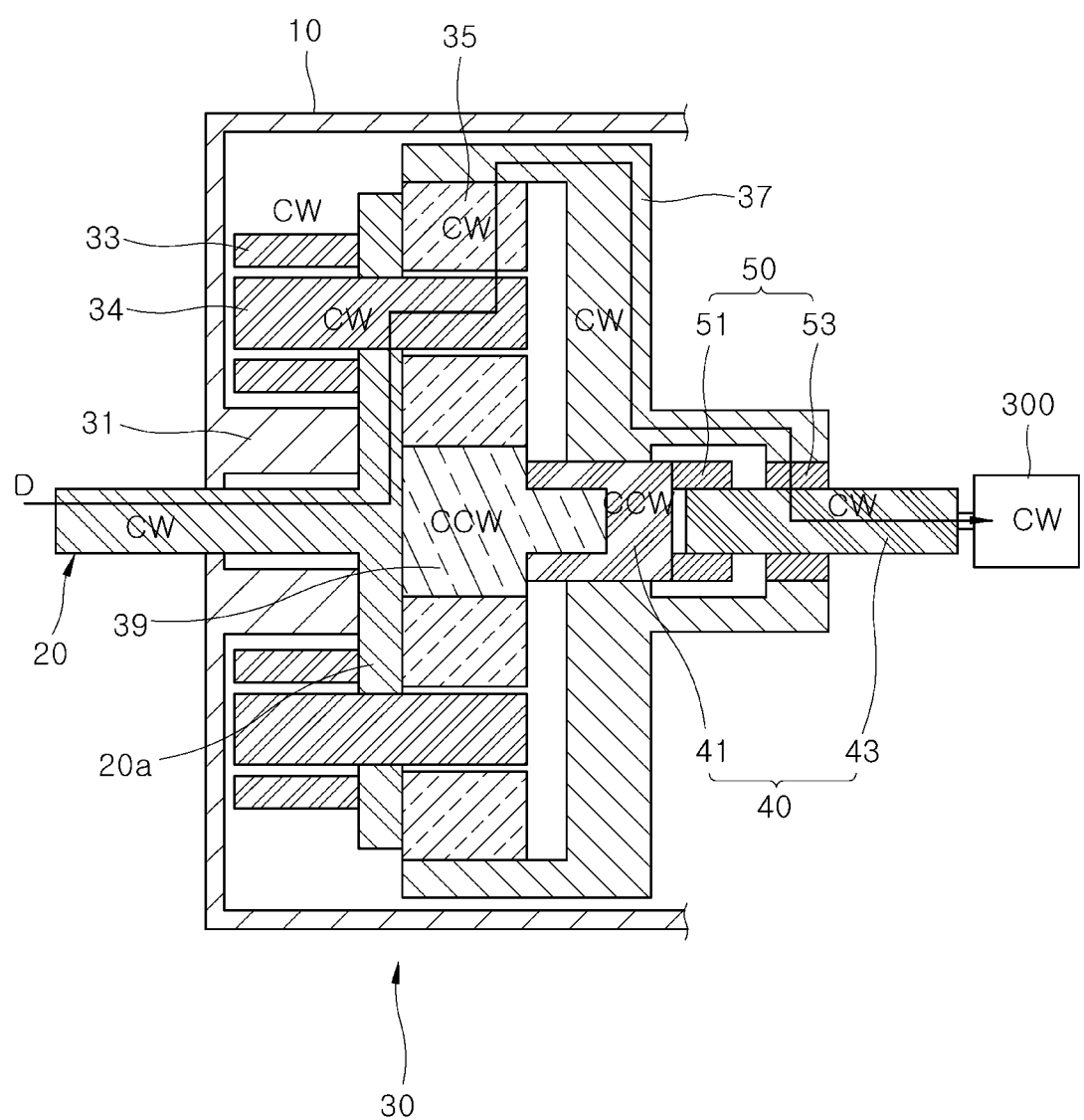
FIG. 4 is a sectional diagram schematically illustrating an operation by the input shaft unit that is rotated in the other direction in the reducer in accordance with the embodiment of the present invention.
Figure 5:
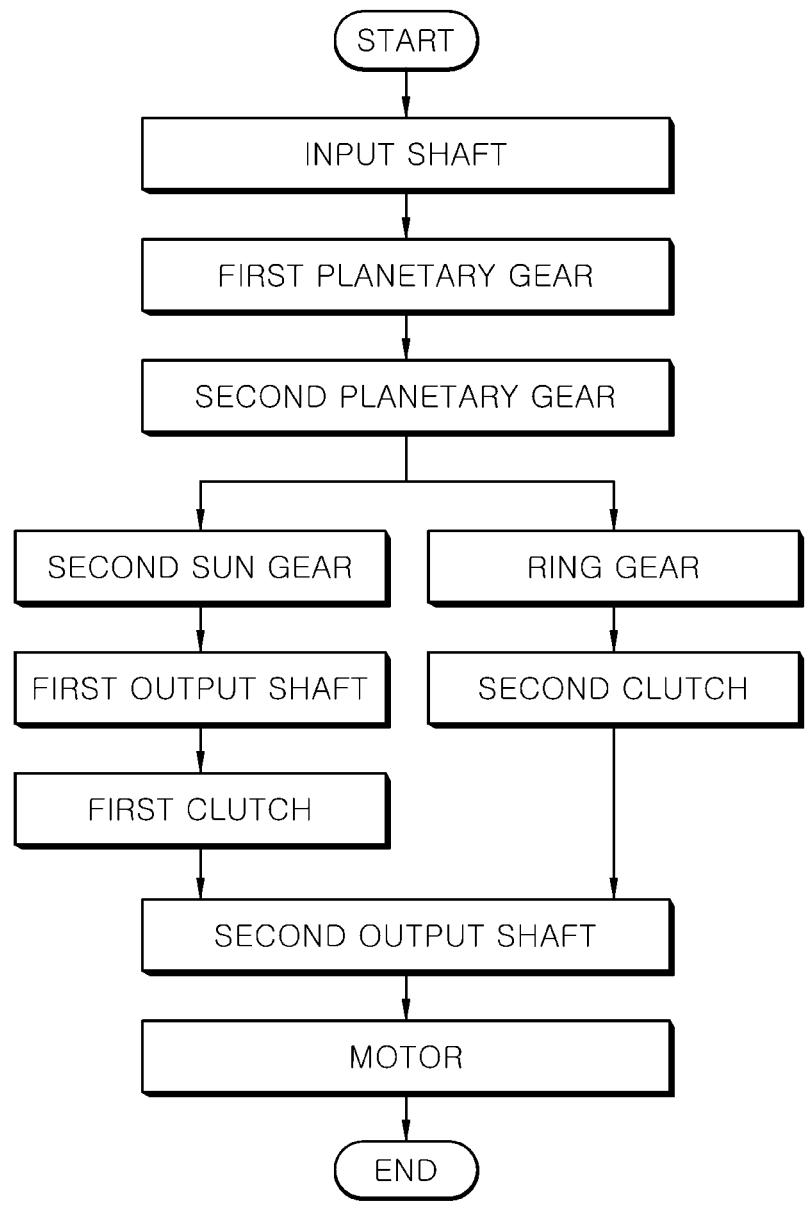
FIG. 5 is a conceptual diagram schematically illustrating an operating sequence in the reducer in accordance with the embodiment of the present invention.
Figure 6:
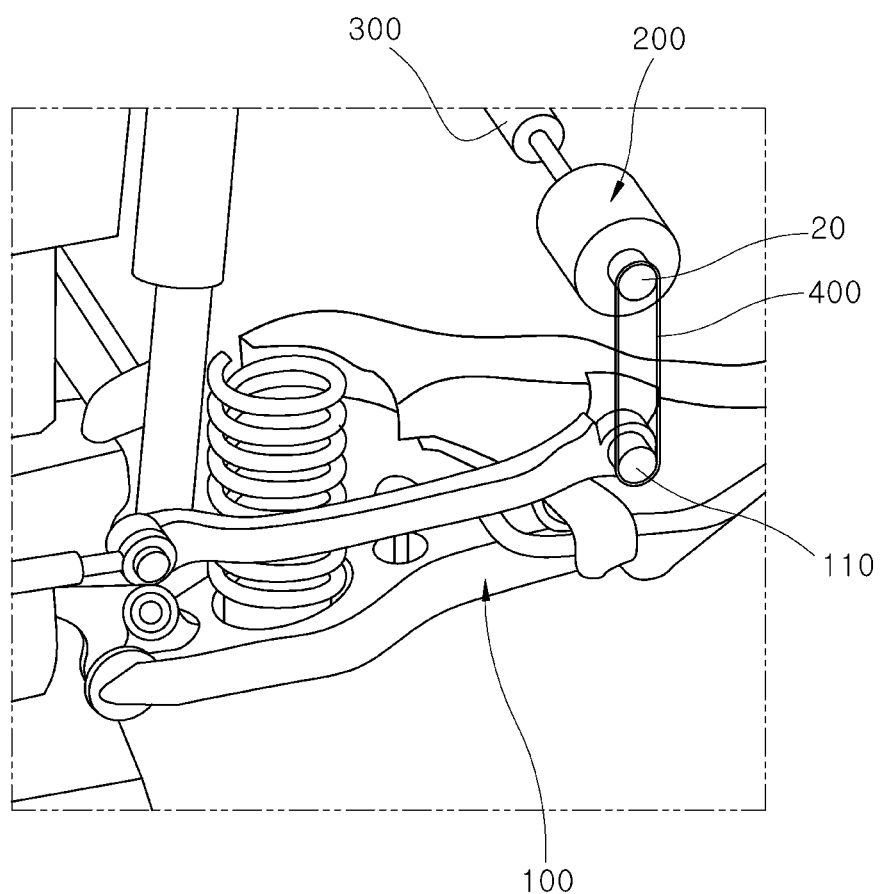
FIG. 6 is a perspective diagram schematically illustrating a suspension system for a vehicle in accordance with another embodiment of the present invention.

FIG. 1 is a perspective diagram schematically illustrating a suspension system for a vehicle in accordance with an embodiment of the present invention, FIG. 2 is a perspective diagram schematically illustrating a reducer in accordance with the embodiment of the present invention, FIG. 3 is a sectional diagram schematically illustrating an operation by an input shaft unit that is rotated in one direction in a reducer in accordance with the embodiment of the present invention, FIG. 4 is a sectional diagram schematically illustrating an operation by the input shaft unit that is rotated in the other direction in the reducer in accordance with the embodiment of the present invention, FIG. 5 is a conceptual diagram schematically illustrating an operating sequence in the reducer in accordance with the embodiment of the present invention, and FIG. 6 is a perspective diagram schematically illustrating a suspension system for a vehicle in accordance with another embodiment of the present invention.

Referring to FIG. 1, the suspension system for the vehicle in accordance with the present embodiment may include a lower arm 100, a reducer 200, and a motor unit 300. The lower arm 100 is vibrated up and down by the vibration of the vehicle. The lower arm 100 is connected to a cross member (not shown) or a frame (not shown), and is connected at an outside thereof to a steering knuckle (not shown) via a ball joint, thus coping with a height, a change in angle, and vibration resulting from a road shock and the operation of a steering mechanism when the vehicle is running.

The reducer 200 is connected to the lower arm 100 so that the vertical vibrating movement of the lower arm 100 is transmitted to the reducer. The motor unit 300 is connected to the reducer 200 so that power is transmitted from the reducer 200 to the motor unit. The motor unit 300 may be charged with power transmitted from the reducer 200 or may directly use the power.

Referring to FIGS. 2 to 5, in the suspension system for the vehicle in accordance with the embodiment of the present invention, the reducer 200 includes a housing 10, an input shaft unit 20, a gear unit 30, an output shaft unit 40, and a clutch unit 50.

The housing 10 defines a space that accommodates the gear unit 30 and the clutch unit 50 therein. The input shaft unit 20 passes through one side (left side of FIG. 2) of the housing 10, and the output shaft unit 40 passes through the other side (right side of FIG. 2) of the housing 10 towards the motor unit 500.

The input shaft unit 20 is rotatably mounted to one side (left side of FIG. 2) of the housing 10, and is connected to the lower arm 100 to be rotated by the operation of the lower arm 100. The input shaft unit 20 is mounted to the lower arm 100 with a gap therebetween. The input shaft unit 20 includes an input-shaft extension 20a. The input-shaft extension 20a is formed on one side (right side of FIG. 3) of the input shaft unit 20 to extend vertically. A connection shaft 34 is connected to the input-shaft extension 20a.

The gear unit 30 is composed of a plurality of gears to transmit a rotating force from the input shaft unit 20 to the output shaft unit 40. The gear unit 30 includes a first sun gear 31, a first planetary gear 33, a second planetary gear 35, a ring gear 37, and a second sun gear 39.

The first sun gear 31 is mounted to the housing 10 to rotatably support the input shaft unit 20. The first sun gear 31 is fixedly mounted to one side (left side of FIG. 3) of the housing 10 to rotatably support the input shaft unit 20 in the through hole. Alternatively, the first sun gear 31 is mounted to the housing 10 to be free rotatable, regardless of the rotation of the input shaft unit 20. A gear is formed on an outer surface of the first sun gear 31 to engage with the first planetary gear 33, so that it is rotated as the first planetary gear 33 rotates, regardless of the rotation of the input shaft unit 20. Alternatively, a gear engaging with the first planetary gear 33 may not be formed.

The first planetary gear 33 is rotatably mounted to one side (left side of FIG. 3) of the connection shaft 34 that is connected to the input-shaft extension 20a of the input shaft unit 20. The first planetary gear 33 is rotated in the same direction as the rotating direction of the input shaft unit 20.

The second planetary gear 35 is rotatably mounted to the other side (right side of FIG. 3) of the connection shaft 34 that is connected to the input-shaft extension 20a of the input shaft unit 20. The second planetary gear 35 is connected with the first planetary gear 33 via the connection shaft 34, and is rotated in the same direction as the rotating direction of the first planetary gear 33.

The ring gear 37 engages at an inner surface thereof with the second planetary gear 35, and is rotated in the same direction as the rotating direction of the second planetary gear 35. The second sun gear 39 engages at an outer surface thereof with the second planetary gear 35, and is rotated in a direction opposite to the rotating direction of the second planetary gear 35.

The second sun gear 39 engages with the outer surface of the second planetary gear 35, and is rotated in the direction opposite to the rotating direction of the second planetary gear 35.

The output shaft unit 40 receives power from the gear unit 30 and then transmits the power to the motor unit 300. The output shaft unit 40 is connected with the motor unit 300. The output shaft unit 40 includes a first output shaft 41 and a second output shaft 43.

The first output shaft 41 is connected with the second sun gear 39, and is rotated as the second sun gear 39 rotates. The first output shaft 41 is rotated in the same direction as the rotating direction of the second sun gear 39.

The second output shaft 43 is connected at one side (left side of FIG. 3) thereof with the first output shaft 41 via a first clutch 51, and is connected at the other side (central side of FIG. 3) thereof with the ring gear 37. The second output shaft 43 is selectively connected by the clutch unit 50 so that the rotation of the first output shaft 41 or the ring gear 37 is selectively transmitted. That is, if the rotation of the first output shaft 41 is transmitted by the first clutch 51, the second output shaft 43 is rotated in the same direction as the rotating direction of the first clutch 51. Meanwhile, if the rotation of the ring gear 37 is transmitted by the second clutch 53, the second output shaft 43 is rotated in the same direction as the rotating direction of the ring gear 37. An operation of the clutch unit 50 will be described below.

The clutch unit 50 is interposed between the gear unit 30 and the output shaft unit 40 to selectively connect or disconnect the gear unit 30 and the output shaft unit 40 to or from each other. In the present invention, the clutch unit 50 comprises a one-way clutch that is rotated in one direction but is not rotated in the other direction. The clutch unit 50 includes the first clutch 51 and the second clutch 53. In the present invention, the one-way rotation where the clutch unit 50 transmits power is set as clockwise (CW) rotation. The one-way rotation of the clutch unit 50 is optional. Counterclockwise (CCW) rotation may be selected as the one-way rotation.

The first clutch 51 is interposed between the first output shaft 41 and the second output shaft 43, and rotates the second output shaft 43 while being rotated by the first output shaft 41 that is rotated in one direction. If the first output shaft 41 is rotated in the other direction, the first clutch 51 does not transmit the rotating power of the first output shaft 41 to the second output shaft 43 while free-wheeling.

The second clutch 53 is interposed between the ring gear 37 and the second output shaft 43, and rotates the second output shaft 43 while being rotated by the ring gear 37 that is rotated in one direction. If the ring gear 37 is rotated in the other direction, the second clutch 53 does not transmit the rotating power of the ring gear 37 to the second output shaft 43 while free-wheeling.

FIGS. 2 and 3 illustrate an example where the input shaft unit 20 is rotated counterclockwise. Reference numeral D is a power transmission line. If the input shaft unit 20 rotates counterclockwise, the first planetary gear 33 rotates counterclockwise in conjunction with the input shaft unit 20, and the second planetary gear 35 connected with the first planetary gear 33 via the connection shaft 34 also rotates counterclockwise.

The ring gear 37 engaging at the inner surface thereof with the second planetary gear 35 also rotates counterclockwise, and transmits the rotation to the second clutch 53. The second clutch 53 does not transmit the counterclockwise rotation of the ring gear 37 to the second output shaft 53.

Meanwhile, the second sun gear 39 is rotated in the clockwise direction that is a direction opposite to that of the second planetary gear 35 rotated counterclockwise. The first output shaft 41 connected with the second sun gear 39 is rotated clockwise, and the first clutch 51 interposed between the first output shaft 41 and the second output shaft 43 transmits the clockwise rotation of the first output shaft 41 to the second output shaft 43. A motor shaft of the motor unit 500 connected with the second output shaft 43 is also rotated clockwise.

FIG. 4 illustrates an example where the input shaft unit 20 is rotated clockwise. Reference numeral D is a power transmission line. If the input shaft unit 20 is rotated clockwise, the first planetary gear 33 is rotated clockwise in conjunction with the input shaft unit 20, and the second planetary gear 35 connected with the first planetary gear 33 via the connection shaft 34 is also rotated clockwise.

The ring gear 37 engaging at the inner surface thereof with the second planetary gear 35 is also rotated clockwise, and then transmits the rotation to the second clutch 53. The second clutch 53 transmits the clockwise rotation of the ring gear 37 to the second output shaft 53. The motor shaft of the motor unit 500 connected with the second output shaft 43 is likewise rotated clockwise.

Meanwhile, the second sun gear 39 is rotated in the counterclockwise direction that is a direction opposite to that of the second planetary gear 35 rotated clockwise. The first output shaft 41 connected with the second sun gear 39 is rotated counterclockwise, and the first clutch 51 interposed between the first output shaft 41 and the second output shaft 43 does not transmit the counterclockwise rotation of the first output shaft 41 to the second output shaft 43.

As described above, the one-way (clockwise direction in the embodiment of the present invention) rotation is transmitted to the motor unit 500, regardless of the case where the input shaft unit 20 is rotated counterclockwise or clockwise by the vibration transmitted from the lower arm 100. That is, it is not affected by rotational inertia generated by the motor and other components. Therefore, it is possible to continuously recover energy and control the ride comfort.

Another embodiment of the present invention where a belt unit 400 is mounted between the lower arm 100 and the reducer 200 will be described with reference to FIG. 6. The belt unit 400 connects a lower arm shaft 110 of the lower arm 100 with the input shaft unit 20 of the reducer 200, and transmits the rotation of the lower arm shaft 100 to the input shaft unit 20 of the reducer 200. The belt unit 400 may have the structure of a belt or a chain. The belt unit 400 may be applied when a central axis of the lower arm 100 is not aligned with that of the reducer 200. The configuration and operation of the reducer 200 and the motor unit 300 remain the same as the above description.

In accordance with the present embodiments, the suspension system for the vehicle can recover the vertical movement, such as vibration, produced when the vehicle is running, thus generating power and thereby recycling energy.

Furthermore, in accordance with the present invention, it is possible to recover the vertical movement, thus recycling energy and simultaneously absorbing the vibration of the vehicle.

Furthermore, in accordance with the present invention, it is possible to transmit power to the motor unit in a predetermined direction regardless of the rotating direction of the input shaft unit.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A suspension system for a vehicle, comprising:
   a lower arm configured to perform a vibrating movement by vibration of the vehicle;
   a reducer connected to the lower arm so that the vibrating movement of the lower arm is transmitted thereto; and
   a motor unit connected to the reducer, and configured to receive power from the reducer,
   wherein the reducer comprises:
   a housing;
   an input shaft unit rotatably mounted to the housing, and connected to the lower arm to be rotated by vibration of the lower arm;
   a gear unit configured to receive a rotating force from the input shaft unit;
   an output shaft unit configured to receive power from the gear unit; and a clutch unit configured to selectively connect the gear unit with the output shaft unit,
wherein the gear unit comprises:
a first sun gear mounted to the housing to rotatably support the input shaft unit;
a first planetary gear rotatably mounted to a first side of a connection shaft connected to the input shaft unit, and configured to rotate in the same direction as a rotating direction of the input shaft unit;
a second planetary gear rotatably mounted to a second side of the connection shaft, and configured to rotate in the same direction as a rotating direction of the first planetary gear;
a ring gear engaging at an inner surface thereof with the second planetary gear, and configured to rotate in the same direction as a rotating direction of the second planetary gear; and
a second sun gear engaging at an outer surface thereof with the second planetary gear, and configured to rotate in a direction opposite to the rotating direction of the second planetary gear.

2. The suspension system of claim 1, wherein the output shaft unit comprises:
a first output shaft configured to rotate as the second sun gear rotates; and
a second output shaft configured to be selectively connected by the clutch unit and rotated when rotation is selectively transmitted from the first output shaft or the ring gear.

3. The suspension system of claim 2, wherein the clutch unit transmits power to cause a rotation in one direction.

4. The suspension system of claim 3, wherein the clutch unit comprises:
a first clutch interposed between the first output shaft and the second output shaft, and configured to transmit power of the first output shaft rotated in one direction to the second output shaft.

5. The suspension system of claim 3, wherein the clutch unit comprises:
a second clutch interposed between the ring gear and the second output shaft, and configured to transmit power of the ring gear rotated in one direction to the second output shaft.

6. The suspension system of claim 1, further comprising:
a belt unit connecting a lower arm shaft of the lower arm with the reducer, and configured to transmit a rotating force from the lower arm shaft to the reducer.

* * * * *